United States Patent [19]

Estes et al.

[11] 4,223,731

[45] Sep. 23, 1980

[54] METHOD FOR ENHANCED RECOVERY OF PETROLEUM

[75] Inventors: John H. Estes, Wappingers Falls; Ernest P. Buinicky, Newburch, both of N.Y.

[73] Assignee: Texaco Inc., White Plains, N.Y.

[21] Appl. No.: 963,617

[22] Filed: Nov. 24, 1978

Related U.S. Application Data

[63] Continuation-in-part of Ser. No. 931,693, Aug. 7, 1978.

[51] Int. Cl.$^2$ .............................................. E21B 43/24
[52] U.S. Cl. ...................... 166/272; 166/273; 166/274; 166/302; 166/303
[58] Field of Search ............... 166/272, 273, 274, 275, 166/302, 303, 305 R

[56] References Cited

U.S. PATENT DOCUMENTS

| | | | |
|---|---|---|---|
| 3,042,114 | 7/1962 | Willman | 166/272 |
| 3,258,072 | 6/1966 | Froning | 166/275 X |
| 3,343,601 | 9/1967 | Pye | 166/275 X |
| 3,357,487 | 12/1967 | Gilchrist et al. | 166/272 X |
| 3,360,043 | 12/1967 | Braden, Jr. et al. | 166/272 |
| 3,385,359 | 5/1968 | Offeringa | 166/272 X |
| 3,428,120 | 2/1969 | Metler | 166/275 X |
| 4,078,608 | 3/1978 | Allen et al. | 166/272 X |

*Primary Examiner*—Stephen J. Novosad
*Assistant Examiner*—George A. Suchfield
*Attorney, Agent, or Firm*—Carl G. Ries; Robert A. Kulason; Gregory A. Cone

[57] ABSTRACT

An enhanced oil recovery method comprising injecting an aqueous solution of ammonium salts selected from the group consisting of ammonium sulfite, ammonium bisulfite, and mixtures thereof into a petroleum-bearing earth formation, heating said injected aqueous solution to a temperature in the range of about 120°–300° F., or higher in the presence of said petroleum-bearing earth formation, flowing said heated aqueous solution through said petroleum bearing earth formation to drive petroleum to a recovery well, and producing increased amounts of petroleum from said earth formation through said recovery well.

13 Claims, No Drawings

METHOD FOR ENHANCED RECOVERY OF PETROLEUM

This application is a continuation-in-part of copending application Ser. No. 931,693, filed Aug. 7, 1978.

BACKGROUND OF THE INVENTION

This invention relates to methods for recovering oil from a petroleum bearing earth formation by injecting fluids to flush oil from the pores of said earth formation and recover such oil at one or more recovery wells. More particularly, this invention relates to improved flooding processes for recovery of petroleum employing aqueous solutions of ammonium salts selected from the group consisting of ammonium sulfite, ammonium bisulfite and mixtures thereof as flooding medium, or as constituents thereof. According to the invention, aqueous solutions of said ammonium salts may be injected into a petroleum bearing earth formation as a bank of primary drive medium at ambient temperatures above the freezing point of said solution. Within the earth formation said aqueous solution may be heated by direct exchange with the earth formation, or by other means such as steam injection, to a temperature in the range of about 120°–300° F., or higher to provide an agent for driving oil from said earth formation to a recovery well.

For enhanced recovery of oil from petroleum bearing earth formations, it has become conventional practice to use a drive fluid under pressure to sweep oil remaining in said earth formation to a recovery well after primary production by gas drive, water drive or pumping has become uneconomical. Such sweep techniques may also be practiced early in the life of an oil field to maintain earth formation pressure. Normally for such enhanced recovery techniques one or more boreholes drilled into said earth formation are employed as injection wells and one or more boreholes, drilled into said earth formation at predetermined spacings from said injection wells, are employed as recovery wells. Sweep fluid, selected from oil miscible fluids, oil immiscible fluids, and combinations thereof, is injected into the injection wells and forms a bank of primary drive agent. The primary drive agent is then pressured through the earth formation, by injection of additional fluid, toward the recovery well or wells. Oil displaced from the earth formation by the sweep fluid is then produced from the recovery well or wells.

Oil recovery from subterranean formations is limited in enhanced recovery processes employing immiscible drive fluids, such as water and/or brines. Capillary forces and surface tension phenomena within rock pores of the subterranean formations prevent recovery of more than a fraction of the oil in place.

Use of a bank of primary drive agent miscible with the petroleum improves recovery of oil. Preferably in such processes oil miscible primary drive agent, such as liquefied hydrocarbon gases, carbon dioxide, etc. is injected into the oil-containing earth formation to form a bank of primary drive fluid. This primary drive fluid is pressured through the formation toward a recovery well by a backing drive fluid such as water, steam, additional gases, etc. The injection of primary drive agent is generally restricted in volume due to cost of liquids miscible with oil. The cost of enhanced recovery processes using oil miscible drive agents coupled with the relatively low value of additional oil recovered as a consequence serves to make such processes expensive, and not altogether successful, considering the amount of unrecovered oil remaining in subterranean formations after such recovery efforts.

Processes for enhanced recovery of oil from subterranean formations employing liquid sulfur dioxide, or aqueous solutions of sulfur dioxide as primary drive agent have been disclosed. For example see U.S. Pat. No. 3,353,597 and No. 3,326,289. Although such processes disclose improved recovery of oil, the disadvantages of handling a poisonous volatile, corrosive material such as sulfur dioxide are considerable.

SUMMARY OF THE INVENTION

Now, according to the method of the present invention we have discovered an improved process for recovery of oil from subterranean oil-bearing formations employing a primary drive fluid comprising an aqueous solution of ammonium salts selected from the group consisting of ammonium bisulfite, ammonium sulfite, and mixtures thereof.

In one embodiment of the present invention a liquid aqueous solution, comprising from about 0.01 to about 1.0 moles/liter of an ammonium salt selected from ammonium bisulfite, ammonium sulfite, and mixtures thereof dissolved in water or brine, at a temperature preferably below about 120° F. is injected, via an injection well, into an oil containing subterranean earth formation. In the earth formation the said aqueous solution is heated, by direct heat exchange with the subterranean formation or by an external source such as steam injection, to a temperature above about 120° F., and preferably in the range of from about 200°–300° F. The heated aqueous solution is pressured, by injection of additional fluid via the injection well, through the subterranean formation toward a recovery well. Additional oil, over that producible from the subterranean formation by primary production techniques is recovered from the recovery well.

In a second embodiment of the present invention said heated aqueous solution is pressured into the subterranean formation from an injection well employing an injection fluid. After a time, pressure on the injection well is reduced such that petroleum from the subterranean formation flows into the injection well, from which the petroleum is produced to the surface.

Advantages of the present invention include increased oil recovery from subterranean formations, employing an economical drive fluid, e.g. an aqueous solution of an ammonium bisulfite, ammonium salt selected from the group consisting of ammonium sulfite, and mixtures thereof. Further, corrosion of well casing and associated piping by acid attack is substantially reduced, even at high temperatures. These and other advantages of the present invention are discussed in the detailed description which follows.

DETAILED DESCRIPTION OF THE INVENTION

We have found aqueous solutions of ammonium bisulfite to be surprisingly effective as a drive agent for displacing additional oil from petroleum bearing earth formations at temperatures above 120° F. No theory explaining the effectiveness of such ammonium bisulfite in displacing oil from earth formations is formulated herein. However, it is noted that ammonium bisulfite in aqueous solution at temperatures above about 120° F. tends to disassociate (into ammonia and sulfur dioxide). Within the earth formation, ammonium bisulfite and/or decomposition products may react with components of the earth formation. Ammonia is an effective emulsifying agent for water and oil. Also, it is noted that carbon dioxide, which is a product of the reaction of sulfur dioxide with carbonate minerals, is oil soluble, results in swelling and viscosity reduction of the oil, and is known to be a useful agent for enhanced oil recovery. Although we do not wish to be bound by any theory of the mechanism by which aqueous ammonium bisulfite serves to enhance petroleum recovery from earth formation, the properties of ammonia and carbon dioxide, which may be present at elevated temperatures, suggests that they would serve for such enhanced recovery.

Additionally, we have discovered that aqueous solutions of ammonium sulfite are effective drive agents for displacing additional oil from petroleum bearing earth formations at temperatures above about 120° F., preferably in the range of about 200°–300° F. As in the case for ammonium bisulfite above, it is noted that ammonium sulfite tends to disassociate at temperatures of about 60°–70° C. (140°–158° F.), forming ammonia and sulfur dioxide. Consequently, it may be assumed that solutions of both said ammonium salts behave simularly in acting to improve recovery of petroleum from subterranean earth formations.

Effective concentrations of the ammonium salts disclosed herein for such aqueous solutions are in the range of from about 0.01 molar to the saturation concentration at injection conditions. Ammonium salt concentrations in such aqueous solutions of about 0.1 molar are preferred.

Aqueous solvent for dissolving such ammonium salts may comprise water or brine. The water may be from any convenient source, such as surface water, well water, etc., and the brine may be connate water recovered from the same or other subterranean formations from which the oil is to be produced.

Subterranean formations in which said aqueous solutions of the present invention may be employed are those oil bearing formations having porosity and permeability sufficient to allow injection of said aqueous solutions and subsequent recovery of displaced oil. Such formations may comprise siliceous and/or carbonate rock, such as limestone, sandstone, dolomite, chalk, unconsolidated sand, etc.

According to the present invention, an aqueous liquid solution of said ammonium salts is injected into an oil bearing earth formation through one or more injection wells, preferably at a temperature less than about 120° F. At temperatures below 120° F., such aqueous ammonium salt solutions are stable and aqueous solutions of said ammonium salts are not particularly corrosive. Thus such aqueous solutions of said ammonium salts are easily handled without special equipment or procedure.

Concentrations of said ammonium salts salts in said aqueous solutions are within the range of about 0.01 to about 1.0 moles/liter, and preferably about 0.1 moles/liter. The aqueous solvent is preferably selected from water or brine, and may contain other additives, such as surface active agents, oil soluble components, thickening agents etc., which do not adversly affect the action of the ammonium salt solutions for enhanced recovery of oil from oil bearing earth formations. At ammonium salt concentrations below about 0.01 moles/liter, the solutions do not substantially enhance petroleum recovery. At concentrations above about 1.0 moles per liter, the solutions are approaching saturation concentration.

Within an earth formation, injected ammonium salt solutions are heated to a temperature above about 120° F. preferably about 200°–300° F. In the case where earth formation is hot, an injected ammonium salt solution may be heated by direct heat exchange with the hot earth formation. In other cases, wherein an earth formation is not sufficiently hot, an injected ammonium salt solution may be heated by injection of hot fluids such as steam, hot water, combustion gases, etc. In appropriate cases, injected ammonium salt solutions may be heated by in situ combustion of a portion of the hydrocarbons in place within the earth formation. Maximum temperature of the injected ammonium salt solution should be maintained below the boiling point, at formation pressure, to ensure presence of a liquid solution for enhancing oil recovery.

Hot ammonium salt solution is forced through an earth formation by injection of a drive fluid into the earth formation via an injection well. The drive fluid may be additional ammonium salt solution, or it may be the same fluid employed for heating the ammonium salt solution, e.g. steam, hot water, air, etc. In cases where an ammonium salt solution is maintained at a selected temperature above 120° F., by direct heat transfer from the earth formation, the drive fluid may be selected from other fluids such as carbon dioxide, light hydrocarbon gases, water, brine, etc. The drive fluid forces an ammonium salt solution into an earth formation wherein the ammonium salt solution acts to displace oil from the pores and interstitial spaces of the earth formation.

In a preferred embodiment of the present invention, the oil displaced by an ammonium salt solution is moved through the earth formation to a recovery well, from which the displaced oil is produced to the surface. Production of oil in this manner is continued until such production is no longer economically justified.

In a second embodiment of the present invention, an ammonium salt solution is driven into an earth formation, under pressure, from an injection well for a period of time, displacing oil from the pores and interstitial spaces of the earth formation. At the end of the time period, pressure upon the injection well is relieved, and petroleum in admixture with injected fluids is produced from the injection well. This process may be repeated until the production rate of petroleum is no longer economically justified.

The volume of aqueous ammonium salt solutions injected is preferably at least a substantial fraction of the pore volume to be swept by the drive fluid. That is, volumes of aqueous ammonium salt solutions equivalent to about 0.5 to about 10 pore volumes of the earth formation are preferred. A volume of aqueous ammonium salt solution will be used to produce an advancing bank in the earth formation of at least one foot in thickness. At lesser volumes, the amount of additional oil produced will not economically justify the expense of injecting and pressuring the drive fluids through the earth formation.

EXAMPLE I

In order to demonstrate the effectiveness of the present invention, the following experiment was performed.

A quartz sand was screened to provide a sand mixture having the following size distribution:

| SAND SIZE DISTRIBUTION | |
| --- | --- |
| Tyler Mesh | WT. % |
| 40–60 | 43 |
| 60–100 | 37 |
| 100–200 | 11 |
| 120–200 | 6 |
| 200+ | 3 |

This sand mixture was then heated to 1000° F. for four hours.

A sand core was prepared by adding the heat-treated sand to a core tube filled approximately half full of water. The sand was compacted by tapping the tube, after which excess water was drained. Metal fillings, with glass-wool plugs were connected to the ends of the core tube for confining the packed sand.

The sand-packed core tube was mounted vertically with appropriate connections for injecting and recovering fluids, measuring pressure, etc. Brine was pumped downflow through the sand-pack in the core tube such that the sand-pack pore volume was filled before emplacement of crude oil.

Arabian light crude oil was pumped upflow through the brine-wet sand pack in an amount equivalent to more than twice the sand volume, for displacing brine and emplacing curde oil in the sand pack. The volume of brine displaced was employed to compute the pore volumes in the sand pack, which amounted to 37 percent of the total sand-pack volume.

The oil-saturated sand pack was then flooded with fresh water in an amount equivalent to 5 times the volume of the sand-pack (13.5 times the void volume) for displacing oil from the sand-pack. At the end of the water flooding operation, the sand pack contained 10 weight percent unrecovered oil.

According to the method of the present invention, the sand-pack, after waterflooding, comprising 200 gm. sand containing 20 grams of undisplaced oil, was flooded with a 0.1 molar solution of ammonium bisulfite in water. The ammonium bisulfite solution was pumped through the sand-pack against a back pressure of 300 psig, at a temperature of 300° F., and at a rate of 250 ml/hr. Upon pumping 1000 ml of ammonium bisulfite solution (equivalent to 13.5 times the pore volume of the sand pack), recovered oil from the sand pack amounted to 18 gms (90% recovery).

Thus, it can be seen that by employing the improved recovery process of the present invention, that a major portion (90%) of oil remaining in place after enhanced recovery of water flood may be recovered employing an aqueous ammonium bisulfite solution flood.

EXAMPLE II

This example is provided to demonstrate the effectiveness of an aqueous ammonium sulfite solution for recovery of petroleum.

A sand-pack in a core tube was prepared as described above in Example I, such that after waterflooding the sand pack comprised 200 gm. sand containing 20 grams undisplaced oil. This sand pack was flooded with a 0.1 molar solution of ammonium sulfite in water. The ammonium sulfite solution was pumped through the sand-pack against a back of pressure of 300 psig., at a temperature of 300° F., and at a rate of 250 ml/hr. Upon pumping 1,000 ml. of ammonium sulfite solution (equivalent to 13.5 times the pore volume of the sand-pack), recovered oil from the sand pack amounted to 16.5 gms (82.5% recovery).

Thus, it can be seen that by employing the improved recovery process of the present invention, that a major portion (82.5%) of oil remaining in place after water flood may be recovered employing an aqueous ammonium sulfite flood.

From the above description and example many variations and modifications of the present invention will be apparent to those skilled in the art, which variations and modifications are within the spirit and scope of the present invention. Therefore, the present invention is intended to be limited only as indicated in the appended claims.

We claim:

1. In a process for the recovery of petroleum oil from an earth formation penetrated by at least one injection well and by at least one recovery well spaced therefrom, the method which comprises:
   (a) injecting, via said injection well, an aqueous solution of an ammonium salt selected from the group consisting of ammonium bisulfite, ammonium sulfite, and mixtures thereof at a temperature less than about 120° F. into said earth formation;
   (b) heating said injected aqueous solution to a temperature above about 120° F.;
   (c) driving said heated aqueous solution from said injection well toward said production well for displacing petroleum oil from said earth formation; and
   (d) producing said displaced petroleum oil from said recovery well.

2. The method of claim 1 wherein said aqueous solution comprises from about 0.01 to about 1.0 moles of ammonium salt per liter of solution.

3. The method of claim 2 wherein said aqueous solution solvent selected from the group consisting of water and brine.

4. The method of claim 3 wherein said injected aqueous solution is heated by injection of a hot drive fluid into said earth formation via said injection well.

5. The method of claim 4 wherein said ammonium concentration in said aqueous solution is about 0.1 moles/liter and wherein said injected aqueous solution is heated to about 200°–300° F.

6. The method of claim 3 wherein said injected aqueous solution is heated by direct heat exchange with said earth formation.

7. The method of claim 3 wherein said injected aqueous solution is heated by direct heat exchange with said earth formation.

8. The method of claim 7 wherein said injected aqueous solution is driven through said earth formation by injection of a drive fluid via said injection well.

9. The method of claim 8 wherein said ammonium salt concentration in said aqueous solution is about 0.1 moles/liter.

10. The method of claim 8 wherein said ammonium salt is ammonium sulfite.

11. In the recovery of petroleum oil from an earth formation penetrated by at least one injection well, the method which comprises:
   (a) injecting, via said injection well, an aqueous solution of an ammonium salt selected from the group consisting of ammonium bisulfite, ammonium sulfite, and mixtures thereof at a temperature less than about 120° F. into said earth formation;

(b) heating said injected aqueous sulfite solution to a temperature about 120° F.;
(c) injecting a drive fluid, at an elevated pressure, into said injection well for driving said aqueous solution into said earth formation and displacing oil from the pores and interstitial spaces of said earth formation;
(d) relieving pressure on said injection well such that displaced oil, said aqueous solution and other injected fluids flow from said earth formation to said injection well; and
(e) producing petroleum from said injection well.

12. The method of claim 11 wherein said aqueous ammonium salt solution comprises from about 0.01 to about 1.0 moles ammonium salt per liter of a solvent selected from the group consisting of water and brine, and wherein said injected aqueous solution is heated to a temperature in the range of about 200°-300° F. within said earth formation.

13. The method of claim 12 wherein said ammonium salts is ammonium sulfite.

* * * * *